United States Patent [19]
Saslow

[11] 3,733,534
[45] May 15, 1973

[54] BATTERY CHARGING DEVICE
[75] Inventor: Seymour Saslow, Saratoga Springs, N.Y.
[73] Assignee: Espey Mfg. & Electronics Corp., Saratoga Springs, N.Y.
[22] Filed: Aug. 25, 1971
[21] Appl. No.: 174,611

[52] U.S. Cl. .........................320/23, 320/39, 320/44
[51] Int. Cl. ................................................H02j 7/04
[58] Field of Search.....................320/39, 40, 35, 44, 320/43, 37, 38, 23

[56] References Cited

UNITED STATES PATENTS

| | | | |
|---|---|---|---|
| 3,178,629 | 4/1965 | Saslow | 320/23 |
| 3,356,922 | 12/1967 | Johnston | 320/40 X |
| 3,409,815 | 11/1968 | Wright et al. | 320/37 X |
| 3,448,239 | 6/1969 | Hill | 320/35 X |
| 3,564,382 | 9/1968 | King et al. | 320/39 |
| 3,421,066 | 1/1969 | Flynn et al. | 320/23 X |
| 3,329,882 | 7/1967 | Sobel | 320/DIG. 1 |
| 3,531,706 | 9/1970 | Mullersman | 320/39 X |

Primary Examiner—J. D. Miller
Assistant Examiner—Robert J. Hickey
Attorney—George B. Oujevolk

[57] ABSTRACT

A battery charging device comprising in combination: a transformer for transforming an AC power line supply into usuable energy; a pulsating charging circuit operatively coupled to said transformer and disposed for charging a battery across a charging terminal (18) supplying a pulsating charging current during each half cycle of AC alternation; sensing circuit means connected to said charging terminal for sensing the voltage charged in said battery during the noncharging ½ cycle; a measurement and memory circuit connected to said charging circuit and said sensing circuit means including storage means for storing a charge therein which is a function of said battery charge; and, control means responsive to said voltage sensing and coupled to said charging circuit for changing the rate of charge for a time period measured by said measurement and control circuit.

4 Claims, 6 Drawing Figures

BATTERY CHARGING DEVICE

BACKGROUND OF THE INVENTION

The present invention relates to battery chargers, and more particularly to a battery charger for nickel cadmium batteries.

BRIEF DESCRIPTION OF THE PRIOR ART

The use of devices, so called cordless, which employ sealed nickel cadmium battery means for their power source have usually employed the technique of float charging or over night charging. These nickel cadmium batteries have found application in electric tooth brushes, shavers, power tools, etc. There have been attempts at fast charging of sealed nickel cadmium batteries, however, as yet there is no system which has been widely adapted or is practical and reliable. The problems encountered in charging sealed cells are somewhat similar to the charging of vented cells, but with certain exceptions.

It is the concensus of opinion that a charge schedule for sealed cells should be one where 110 percent of the energy removed from the cell is replaced, as compared to 150 percent for vented cells. The present invention is directed to a fast charging system which puts a charge and overcharge on the battery as a function of its past discharge cycle.

SUMMARY OF THE INVENTION

Generally speaking, the system contemplated herein employs half-wave charging. A silicon controlled rectifier is used here in this mode. In the off portion of the cycle the battery is interrogated for its open circuit voltage, while in the other half cycle energy is fed into the battery at a high rate. For example, if the particular system uses 2 one ampere hour batteries, the average charging current is 5 amperes with approximately 20 amperes peak. During the off portion of the cycle, while monitoring the open circuit portion, the apparatus looks for the rise of battery terminal EMF. This is done by a voltage sensing means. While the battery is being charged a timing capacitor is receiving a charge which is proportional to the energy delivered to the battery. When the voltage sensing means tells the apparatus that the battery has reached the 90 percent charge point, the charge to the timing capacitor is arrested and the control of the remaining portion of the charge cycle is maintained as a function of the charge retained on the timing capacitor.

During the main charge the timing capacitor is charged up to the battery 0.9C point and then it is allowed to discharge so that 1.1C is put into the battery. For economy and speed of charge the overcharge rate remains the same as the charge rate. From a practical standpoint there is no significant heating of the battery. Repeated cyclical operation deploying this schedule shows on testing that the battery maintains its rated capacity. A diode/resistor network across the SCR provides a float means at a small fraction, about 1/30th of the initial charge rate.

The invention, as well as other object and advantages thereof will become more apparent from the following detailed description when taken together with the accompanying drawings, in which.

Figure 1:
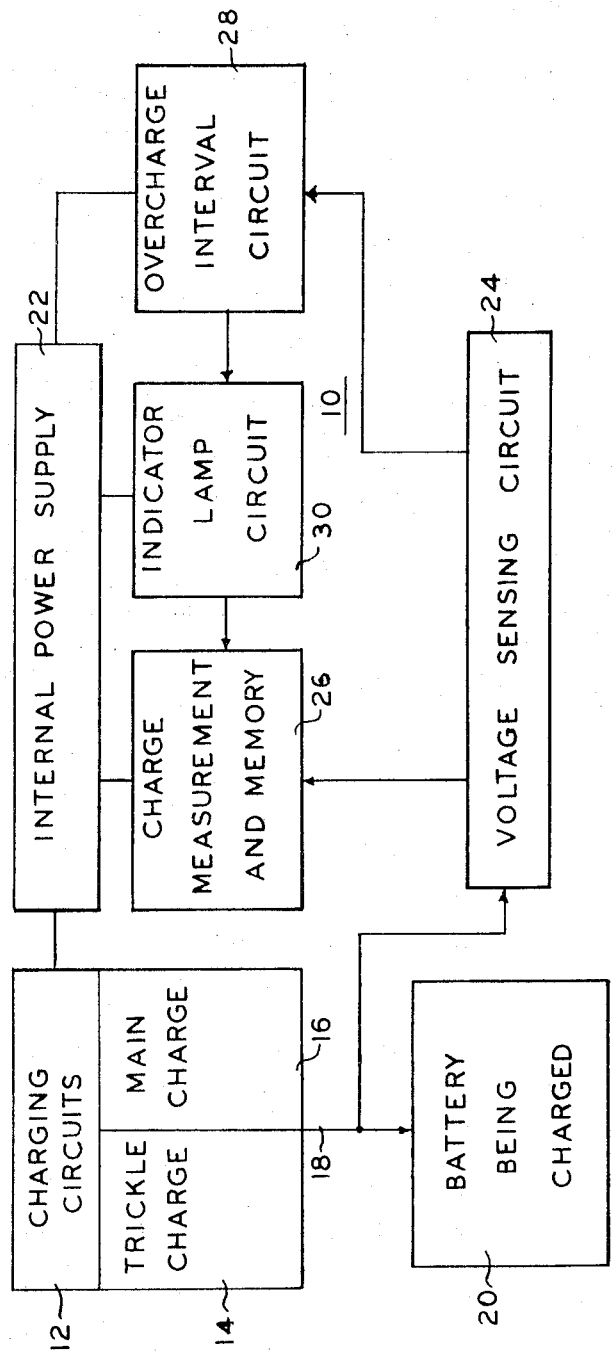
FIG. 1 is a block diagram of a battery charging system contemplated herein.
Figure 3:
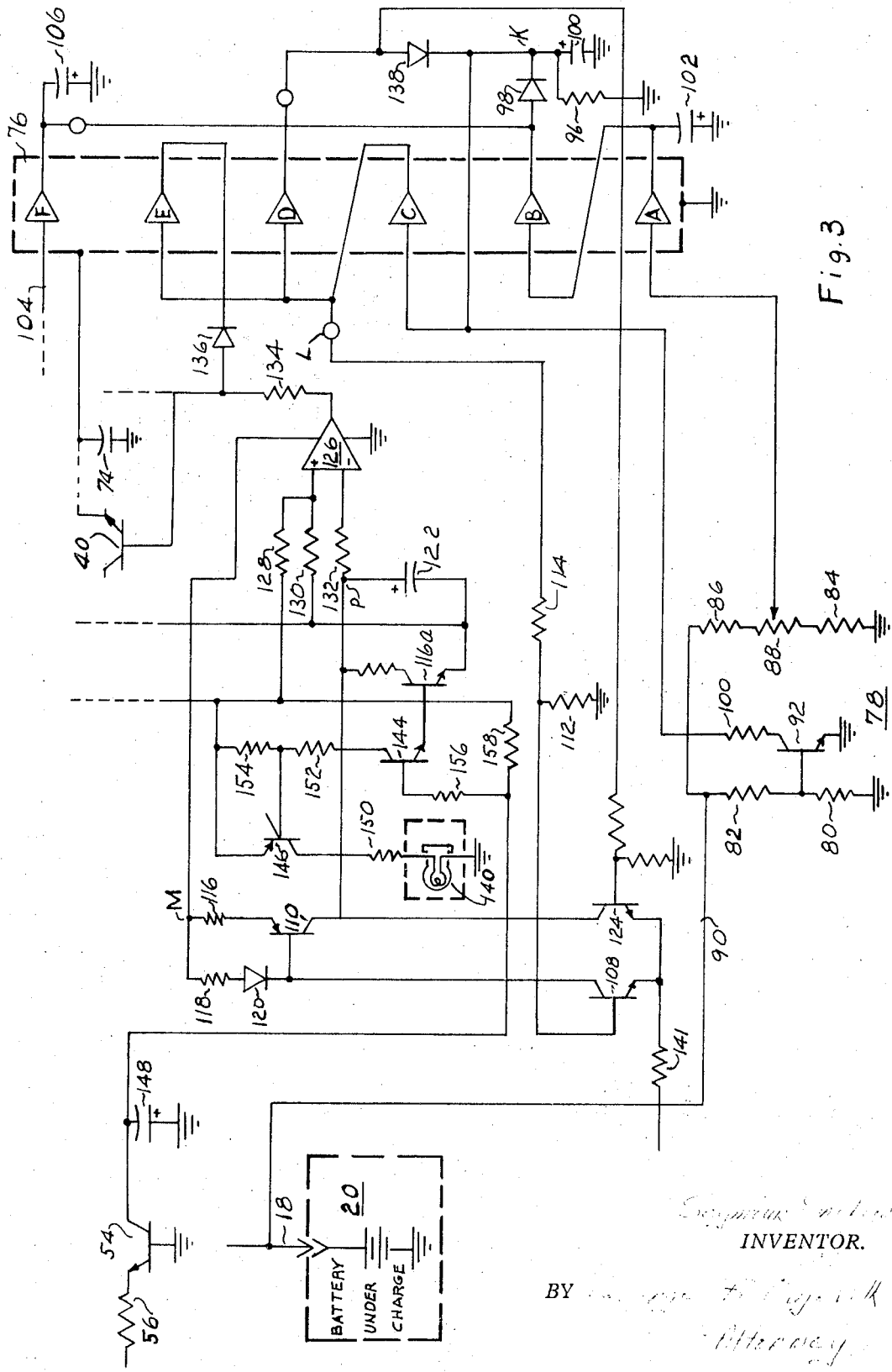
Figure 4:
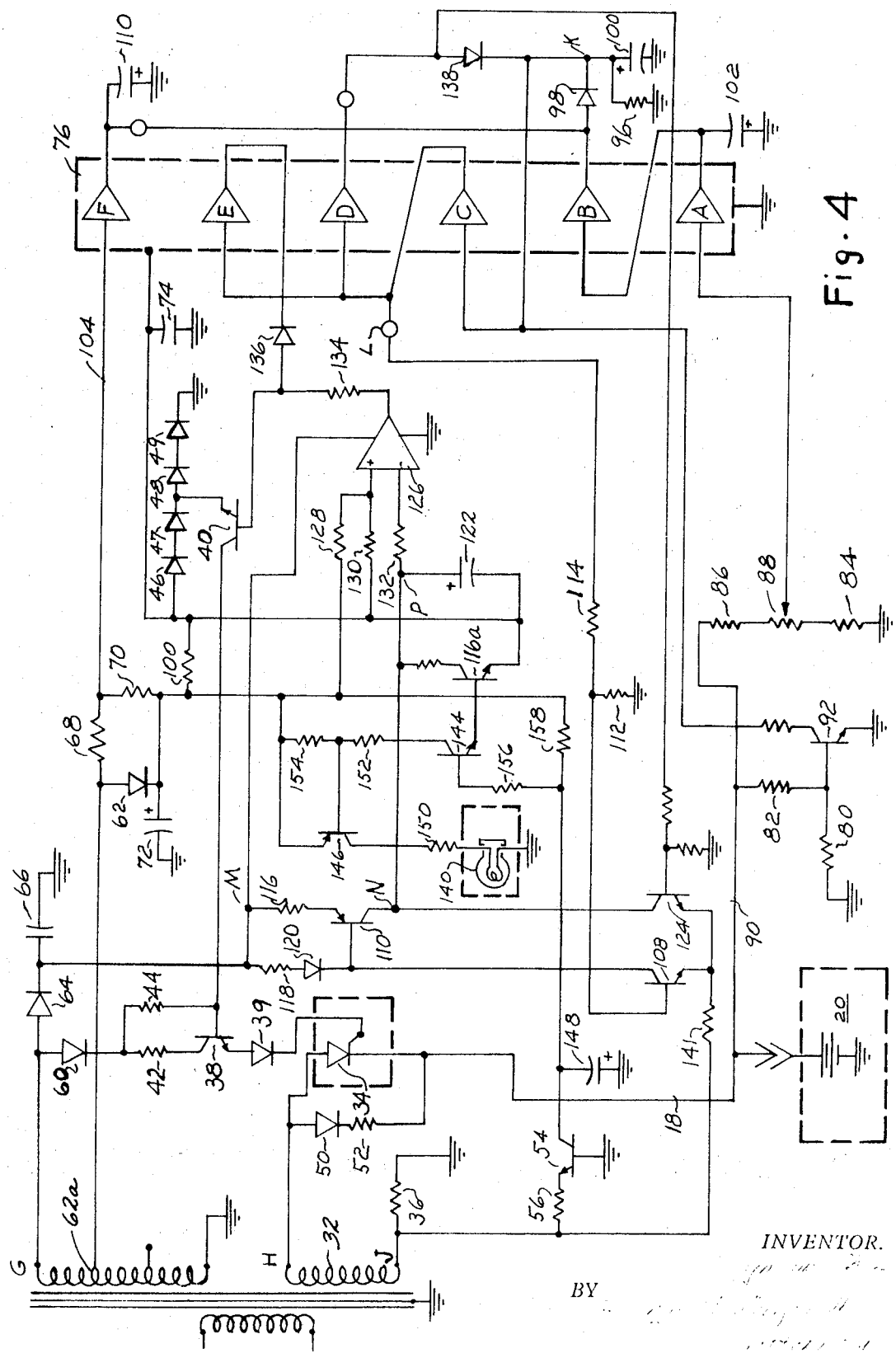
Figure 5:
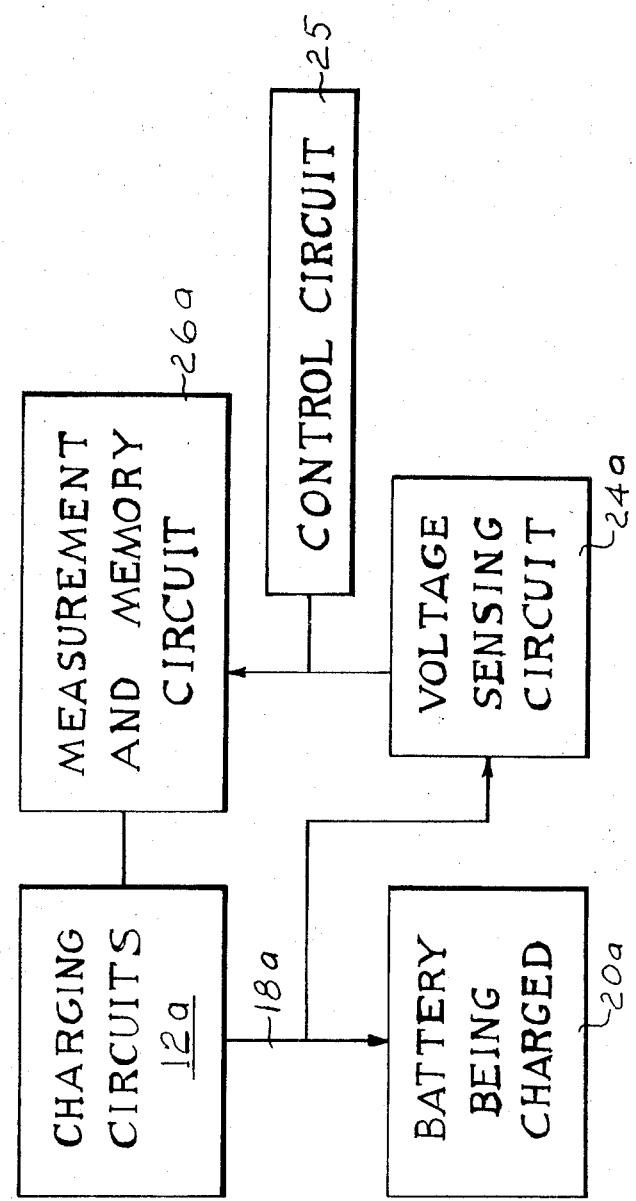
Figure 6:
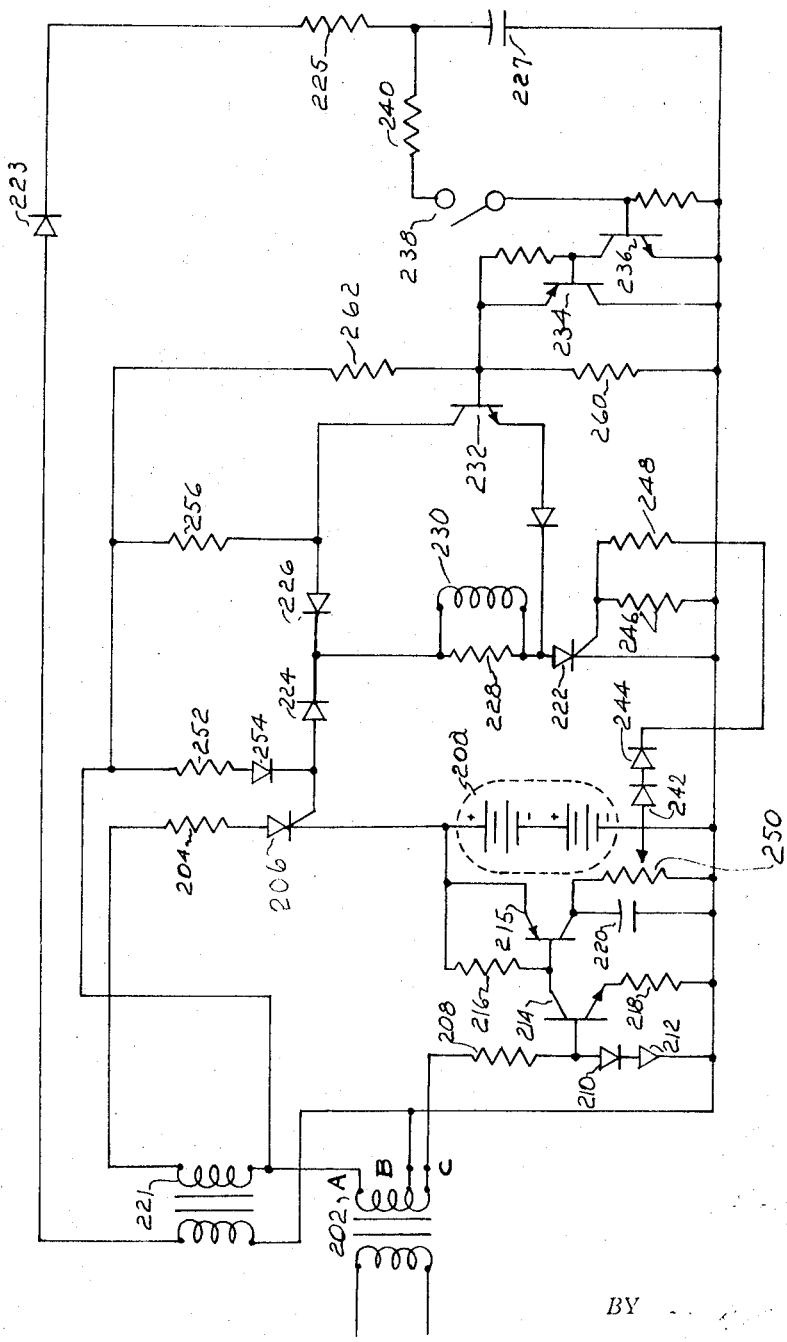

FIG. 3 schematically illustrates other components of the block diagram of FIG. 1;

FIG. 4 is a schematic embodiment of the inventive concept shown in FIG. 1;

FIG. 5 is a block diagram of a second embodiment according to the inventive concept; and, FIG. 6 shows a schematic drawing of FIG. 5.

The device shown in block diagram in FIG. 1 is a pulse-type constant current battery charger, primarily used for recharging nickel-cadmium type secondary cells or batteries. Its use is not restricted to nickel-cadmium batteries, however. The important features of the device shown in FIG. 1 are in the circuits, and their use, that allows an actual measurement of the charge current and charge time required to bring a battery to 90 percent of its full charge capacity. This 90 percent point is normally the potential or voltage point where other charge systems cease charging. The device 10 shown in FIG. 1 includes charging circuits 12 having a trickle charge circuit 14 and a main charging circuit 16, both connected over an output terminal 18 to a battery 20. These charging circuits 12 are connected to an internal power supply 22 and the battery is also coupled to a voltage sensing circuit 24. The voltage sensing circuit 24 is connected to a charge measurement and memory 26 and to an overcharge interval circuit 28. These circuits, in turn, are connected to an indicator lamp circuit 30. The device 10 stores in the charge measurement and memory circuit 26 the total charge current value and total charge time value. When the 90 percent charge point is reached, as measured in the voltage sensing circuit 24, the charge measurement and memory circuit is activated and the main charge 16 is continued for approximately 20 percent of the original charge time. This insures that the battery accepts 100 percent recharge and not the normal 90 percent recharge.

Figure 2:
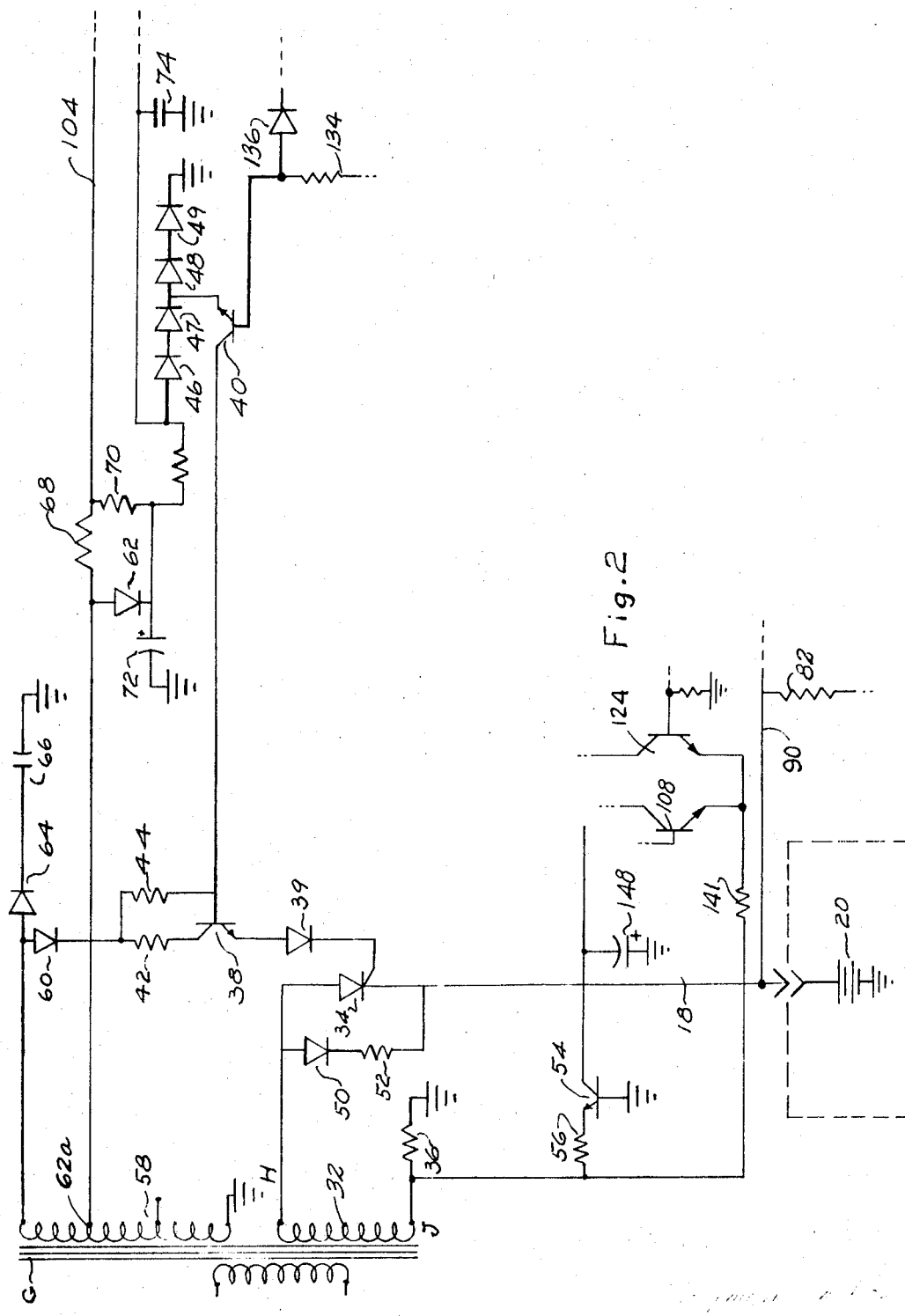
FIG. 2 shows schematically some of the components of the block diagram of FIG. 1.

To facilitate the understanding of the invention, some of the particular circuits illustrated in the block diagram are in some cases shown separately. Thus, the main charging circuit is shown in FIG. 2

THE MAIN CHARGING CIRCUIT

This circuit has a step-down isolation first secondary of a transformer 32, with end points H and J, connected on the one side in series to a main charging SCR 34 in series with the battery 20 being charged, and on the other side to a current limiting resistor 36. The control electrode of the charging SCR 34 is in turn controlled by the emitter electrode of NPN transistor 38 whose base is controlled by the collector electrode of NPN transistor 40. Associated with control transistor 38 are collector resistor 42 and base bias resistor 44. The emitter of transistor 40 is in turn connected midpoint between a line of diodes 46, 47, 48, 49, which provide a voltage reference.

In parallel with main charging SCR 34 is the trickle charge circuit 14 consisting of diode 50 and resistor 52 which are also in series with battery under charge 20. In parallel with current limiting resistor 36 is the input to the indicator lamp, namely, NPN transistor 54 and resistor 56, connected to the transistor emitter. The transistor 54 collector electrode is connected to the indicator lamp circuit.

The main charging SCR 34 supplies half wave charging current to the battery 20 when the transformer 32 terminals H and J are positive. It is gated on by transistor 38 through diode 39. The control transistor for this circuit is transistor 40.

When the main charging SCR 34 is biased off, the trickle current flows through diode 50 and resistor 52. The value of resistor 52 determines the trickle current value.

INTERNAL POWER SUPPLY

Internal power for the unit is supplied across a second secondary 58 with diodes 60 and 62. The output side of diode 60 is in series with the collector electrode of NPN control transistor 38, and the input side is in series with one end of second secondary 58. In parallel with diode 60 is another diode 64 and a capacitor 66 connected to ground. The back-to-back diodes provide power for the control transistor 38. Diode 62 is connected to a tap 62a on the second transformer secondary 58 and supplies the necessary voltage for reference diodes 46, 47, 48, 49 and is in series with these diode bias resistors 68, 70 in parallel with power diode 62 and capacitor 72 in parallel with the output to the reference diodes complete this section of the power circuit. Another output side of the power circuit is to a hexinverter across filter capacitor 74.

The internal power is supplied from half wave rectification by diode 64. It is filtered by capacitor 66. The other half wave rectifier circuit consists of diode 62 and capacitor 72. The voltage reference consists of diodes 46, 47, 48 and 49.

For three of the blocks shown in FIG. 1, namely blocks 24, 26 and 28, that is to say, the voltage sensing circuit, the charge measurement and memory circuit and the overcharge interval circuit, use is made of a hexinverter 76. This hexinverter is shown in FIGS. 3 and 4 and is an integrated circuit chip having six amplifiers therein, A through F. However, use of the hexinverter is only for convenience, since these units are commercially available and are easily connected to perform the required functions. The hexinverter, though of course an extremely useful component, is not essential to the present invention, since the same function can be performed by the use of individual amplifiers. Therefore, although the hexinverter 76 is indicated as being one single unit, for the purpose of understanding the present inventive concept, it is best to disregard the dash-line box around this component and to treat the individual units as if they were not part of an integrated circuit chip. However, since the voltage sensing circuit 24, the charge measurement and memory circuit 26 and the overcharge interval circuit 28 all use the hexinverter 76, these three circuits are shown on one drawing figure, namely FIG. 3.

THE VOLTAGE SENSING CIRCUIT

For this circuit, use is made of hexinverter 76, sections A, B and F. As hereinbefore mentioned, the device charges for ½ cycle and then measures for ½ cycle.

The battery under charge 20 is connected to the charging circuits 12 across an output terminal 18. Connected to the output terminal 18 is a resistor bridge 78 consisting of resistors 80, 82, 84, 86, and variable resistor 88. These resistors are connected to terminal 18 by a line 90. Resistors 80 and 82 are in parallel with the battery and in series across the base of an NPN transistor 92. Resistors 84 and 86 are in parallel with the battery and resistors 80 and 82. Resistors 84 and 86 which are in series with each other across variable resistor 88 form a voltage divider. Variable resistor 88 has an adjustable center tap 94 which connects to amplifier A of hexinverter 76. Amplifier A is in series with amplifier B, which in turn is in series with a voltage sensing resistor 96 across a diode 98. Capacitors 100 and 102 are electrical, noise supression devices, allowing the device to operate satisfactorily in electrically "noisy" environments. Power from the tap of the internal power supply second secondary 58 passes across a supply line 104 to amplifier F of the hexinverter 76 and the output from amplifier F is connected to the output of amplifier B in parallel with storage capacitor 106.

During the non-charging half-cycle, voltage sensing is accomplished by the parallel output connections of hexinverter 76, sections B and F. Hexinverter section A measures the battery voltage through voltage divider resistors 84, 86, and 88. This occurs during both charging and non-charging half-cycles. Hexinverter section B inverts the output of section A. During the charging half-cycle the output of hexinverter 76, section F is low; this clamps the output of section B to ground. During the non-charging half-cycle the output from hexinverter section F is high. When the battery voltage is above its 0.9C value and the non-charging interval occurs at the same time there is a high output signal available at junction point K. This is the junction point between section B, section F and diode 98. This signal is inverted to low by hexinverter section C, disables the charge measuring circuit, and terminates the main charge.

MEASUREMENT AND MEMORY CIRCUIT

The charge measurement and memory circuit 26 includes hexinverter 76 section C, NPN transistors 108 and 110, resistors 112, 114, 118 and PNP transistor 110, diode 120 and memory capacitor 122, transistor 108 has its base connected to the output of section C across resistor 114 to which it is connected at a junction point L. From junction point L, resistor 112 is connected to ground. The collector of transistor 108 is in series with the base of transistor 110 and also in series with diode 120, resistors 118 and 116. One end of resistor 116 is connected to the emitter of transistor 110, whereas the other end is connected to a junction point M where it is joined to resistor 118.

The charge measurement circuit is controlled by section C of the hexinverter 76. During the battery charging intervals, transistor 108 is biased on by section C of hexinverter 76. The collector current of transistor 108 is the turn-on base current for transistor 110. The collector current of transistor 110, at a rate determined by resistor 116 is the input to memory capacitor 122 of the charging current. The charge, received by memory capacitor 122 is directly proportional to the charge received by the battery. Memory capacitor 122 is connected on one side to the collector electrode of transistor 110 at junction points N and P and on the other side to the indicator lamp circuit 30 across NPN transistor 116a, the overcharge interval circuit 28 and to the internal power supply 22 at a junction point Q.

OVERCHARGE INTERVAL CIRCUIT

The charge interval is measured for the time required to bring the battery to the 90 percent or 0.9C condition. This charge interval information is stored in the memory circuit. The main charge is terminated at this 90 percent or 0.9C point and the overcharge interval begins.

It has been determined that the additional energy required to charge a nickel-cadmium battery from its 0.9C status to its charged status amounts to approximately 20 percent of of the energy that was required to charge the battery from its original state of charge to its 0.9C status.

The overcharge interval circuit extends the main charge for a time consistent with the value recorded in the memory. At the completion of the overcharge interval the main charge circuit is turned off, the trickle charge begins, and the charge complete indicator lamp lights.

The overcharge interval circuit 28 generally includes hexinverter 76, section D, NPN transistor 124, differential amplifier 126 and resistors 128, 130, 132, 134, and diodes 136 and 138 which link the voltage sensing circuit 24 to the overcharge interval circuit 28. Section D is connected on the output side to the base of NPN transistor 124 and the output side is also in series with diode 138 connected to junction point K of the voltage sensing circuit and to the collector of voltage sensing NPN transistor 92. Resistors 128 and 130 are in parallel to the plus input of differential amplifier 126 and resistor 132 is connected to the minus input of this differential amplifier. The output side of the differential amplifier 132 is connected across resistor 134 and on the one hand goes across diode 136 and on the other hand goes to the base of control transistor 40. Resistors 128, 130, and 132 on the outer side are respectively connected as follows: 128 is connected to power diode 62 and to the indicator lamp circuit 30; resistor 130 is connected to junction point Q; and, resistor 132 is connected to junction points P and N. Thus, one resistor 130 is connected on one side of memory capacitor 122, while the other resistor 132 is connected to the other side of the memory capacitor.

The overcharge interval is started by a high output signal from section D of the hexinverter 76. It is terminated by the threshold switching voltage of differential amplifier 126. A high signal from hexinverter 76 turns on transistor 124. The simultaneous low signal from hexinverter 76 section C turns off transistor 108 disassembling the memory charge circuit. The collector current of NPN transistor 124 through resistor 141 is the memory discharge current. When the decaying voltage across memory capacitor 122 passes the threshold switching voltage of differential amplifier 126 the output of the differential amplifier 126 switches from low to high.

INDICATOR LAMP CIRCUIT

The indicator lamp circuit includes a lamp 140, NPN transistors 54, 144, 146, capacitor 148, and resistors 150, 152, 154, 156, 158. The lamp 140 is connected to the collector of transistor 146. The emitter of transistor 146 is connected to the collector of transistor 144 and the base of transistor 144 is connected to the emitter of transistor 54. As heretofore mentioned, transistor 54 is the input to the indicator lamp. Resistor 150 provides a load for the lamp. Resistors 152 and 154 are the base bias resistors for transistor 146. Resistor 156 is the base bias resistor for transistor 144, while resistor 158 provides a load bias for transistor 54.

The ready lamp 140 is powered through transistor 146. The control transistor 144 is clamped in its off condition by transistor 54 when charging current is flowing. Transistor 144 turns on during the charging half cycle when the main charge SCR 34 is turned off. Capacitor 148 insures that the lamp stays on for both half cycles of the line supply voltage.

Upon connection to a 115v/60 Hz power source and insertion of a two cell nickel-cadmium battery, the supply begins to function. The supply first measures the battery terminal voltage to determine if a charge is required. If the battery voltage indicates a charged battery the function control circuits inhibit the main charging circuits, allow a trickle charge and energize the charge complete indicator lamp. If the battery requires a charge then the main charge circuits are allowed to function.

A simpler version of the device shown in FIG. 1 is shown in FIG. 5. Here the charging circuits 12a are connected to battery 20a by terminal 18a. The voltage sensing circuit 24a is also connected to the battery, while the measurement and memory circuit 20a is connected to the voltage sensing circuit 24a and to the charging circuits 12a. These circuits in turn are controlled by a control circuit 25.

CHARGING CIRCUIT

The basic charging circuit shown in FIG. 6 consists of a step-down isolation transformer 202, a current limiting resistor 204 and a silicon controlled rectifier (SCR) 206. The secondary low voltage winding of transformer 202 is connected in a series circuit with current limiting resistor 204 and SCR 206 and the battery under charge 20a.

During the secondary voltage half wave interval, point A of the transformer is positive with respect to B. Current which is limited by resistor 204 flows from point A through resistor 204 and SCR 206, if turned on, into the positive terminal of the battery 20a. The return path of this charging current is across the battery 20a to terminal B of the transformer 202.

During the secondary voltage half wave interval, when point A of transformer 202 is negative with respect to point B, no charging current flows. This is because SCR 206 is reverse-biased and presents an open circuit. Also, when point A is positive and SCR 206 is not turned on by its control circuits, no charging current will flow.

THE VOLTAGE SENSING CIRCUIT

The voltage sensing circuit consists of resistor 208, diodes 210, 212, NPN transistor 214, resistor 216, resistor 218, capacitor 220 and winding terminals B and C of transformer secondary 202. Resistor 208 and diodes 210, 212 are in series with terminal C. These bias the base of transistor 214 coupled to the base of NPN transistor 215 by its collector. Resistor 216 provides bias between the collector of transistor 214 and the emitter of transistor 215. Resistor 218 goes from the emitter of transistor 214 to the return path and capacitor 210 goes from the collector of transistor 215 to the return path in parallel to resistor 218.

During the secondary voltage half wave interval when transformer 202 point A is negative and no charging current flows, the point C of the transformer 202 is positive in relation to tap point B. This half wave positive potential supplies base drive to transistor 214.

The collector current of transistor 214 is the base current of transistor 215. The collector current of transistor 215 charges capacitor 220 to the battery voltage minus the saturation voltage of transistor 215. Thus, the capacitor 220 voltage is an image of the battery voltage during the intervals between charging current pulses.

CHARGE MEASUREMENT AND MEMORY CIRCUIT

The charge measurement and memory circuit consists of current transformer 221, diode 223, resistor 225, capacitor 227. All of these are in series. The primary winding of current transformer 221 is in series with the main charge current circuits. The secondary winding of transformer 221 is a faithful reproduction of the primary current at a ratio determined by the current transformer. Resistor 225 limits this current and the current is stored in memory capacitor 227. The capacitor 227 voltage is a direct result of the charging current "ampere-second-area." Diode 223 prevents capacitor 227 from discharging in between battery charging pulses. The control circuit is based on a control SCR 222 in parallel with the battery under charge. This control circuit, in addition to SCR 222 has diodes 224, 226, SCR control resistor 228 in parallel with coil 230, NPN transistors 232, 234, 236, reed relay switch 238 and switch load resistor 240. The control electrode of SCR 222 is controlled by diodes 242, 244 and resistors 246, 248. SCR 222 is in parallel with the battery and fed in series at the base by diodes 224 and 226 while the control electrode is controlled by diodes 242, 244 and resistor 248 series and resistor 246 in parallel with resistor 248. The diodes 242 and 244 in turn are connected to the center top of variable resistor 250 in parallel with capacitor 220 and connected to the control electrode of transistor 215. Firing is provided by resistor 252, diode 254 and parallel load resistor 256. Bias is provided by resistors 260, 262.

Assume a discharged two-cell nickel-cadmium battery 20a is connected per FIG. 6. Upon energizing the primary, and during the positive half wave interval, the gate of SCR 206 is fired through resistor 252 and diode 254. Charging current then flows through SCR 206 and into battery 20a. During each negative half wave interval the battery is interrogated and its voltage is recorded on measuring capacitor 220. This sequence continues until the battery 20a is charged to the 90 percent point. During this charge time control SCR 222 is never turned on and diodes 224 and 226, as well as transistors 232, 234 and 236 remain off.

The 90 percent point is determined from the voltage characteristics of the battery under charge. The control electrode of SCR 222 is fired when this voltage point is reached. The charger voltage reference consists of diodes 242 and 244 and the gate voltage of SCR 222. When the 90 percent point is reached, the circuit through SCR 222 is completed. This accomplishes two distinct functions: (1) energizes reed relay coil 230 and (2) completes the emitter current path for transistor 232. At this same point in time, the reed relay closes completing a discharge path for the current stored in memory capacitor 228. The capacitor discharge current through resistor 226 is the base current for transistor 236.

The collector current of transistor 236 is the base current of transistor 234, when transistor 234 turns on, transistor 232 is biased off. Transistor 232 remains off for the duration of capacitor 228 discharge time. The discharge time of capacitor 228 is a function of the value of resistor 226 and the value of capacitor 228 and the voltage to which capacitor 228 was charged.

The voltage drop across resistor 228 is determined by its resistance and the combined currents of parallel circuits consisting of resistor 252, diode 254 and resistor 256, while SCR 222 is biased off, the voltage at point D junction is great enough to trigger SCR 206 into conduction. After the discharge time of capacitor 228, transistor 236 turns off, transistor 234 turns off, and transistor 232 turns on. When transistor 232 turns on, this completes a current path through resistor 256, transistor 232 and SCR 222 to ground. This lowers the voltage at junction E, allowing a greater current to flow through the circuit with resistor 252, diode 254, resistor 228 and SCR 222. The added current through resistor 252 and diode 254 causes a lower voltage to appear at point D. This low voltage at point D is not great enough to fire SCR 206 and the charge cycle stops.

It is to be observed therefore that the present invention provides for a battery charger which contains the following advantages over other common charges:

(1) Fast recharge, typically 15 minutes for a 1,200 maH battery, (2) complete 100 percent recharge, (3) no discharge path in battery circuit when AC line is turned off, (4) simplicity because of few components, (5) reliability, and (6) low cost.

I claim:

1. In a battery charging device having:
    a. a transformer for transforming an AC power line supply into usuable energy including an SCR in series with said transformer for charging a battery and a current limiting resistor in series with said SCR and said transformer, said SCR including a control electrode;
    b. a pulsating charging circuit operatively coupled to said transformer, SCR and current limiting resistor and disposed for charging a battery across a charging terminal (18) supplying a pulsating charging current during each half cycle of AC alternation;
    c. a diode (39) connected to said SCR control electrode, a gating transistor (38) including an emitter connected to said diode and, a control transistor (40) with one electrode connected to said gating transistor base;
    d. sensing circuit means connected to said charging terminal for sensing the voltage charged in said battery during the non-charging one-half cycle;
    e. a measurement and memory circuit connected to said charging cirucit and said sensing circuit means including storage means for storing a charge therein which is a function of said battery charge;
    f. a trickle charge circuit in parallel with said SCR, connected to said charging terminal (18), having a diode (50) and resistor (52) in series,
    g. control means responsive to said voltage sensing means and coupled to said charging circuit for changing the duration of charge upon a predetermined battery voltage for a time period measured by said measurement and memory circuit, the improvement therein comprising: h. a second secondary (58), an internal power supply (22) connected to said second secondary (58) including first and second power diodes (60, 64) in series with said second secondary (58) in parallel with each other in a back-to-back relationship, one of said diodes being connected to the collector electrode of said gating transistor (38) providing half wave rectification to control the firing of said transistor, a tap on said second secondary, a power diode (62) in parallel with power bias resistors (68, 70) connected to said tap providing rectification of the second half wave, and voltage reference diodes (46, 47, 48, 49) in series with said power diode (62) said power bias resistors (68, 70), the emitter of said control transistor (40) being connected to said voltage reference diodes; and, i. said sensing circuit means being voltage sensing means and including a resistor bridge (80, 82, 84, 86, 88) connected to said terminal (18), a voltage sensing transistor (92) operatively coupled to said bridge, an amplifier (A) connected to said bridge, an inverter (B) connected to said amplifier (A) inverting said amplifier output, a second amplifier (F) connected to said power section connected to said inverter (B) supplying charging information thereto, and, a disable means (c) connected to said inverter (B) and second amplifier (F) to disable the charge measuring and terminate the main charge.

2. A device as claimed in claim 1, including a charge measurement circuit connected to said disable means (C) including a first transistor (108) biased by said disable means (C), a second transistor (110) and rate limiting resistor (116) connected to be turned on by said first transistor (108) and a memory capacitor (122) connected to said second transistor (110) and charged thereby to a value which is a function of the battery charge.

3. A battery charger as claimed in claim 2, including an overcharge interval circuit (28) for storing in a memory the time required to bring the battery up to 90 percent of its full charge, said overcharge interval circuit including, an amplifier (D) connected to the voltage sensing means (92), said disable means (C), and an overcharge transistor (124), a differential amplifier (126) connected to the collector electrode of said overcharge transistor including a plurality of input resistors (128, 130) in parallel to the plus input of said differential amplifier and a resistor (132) connected to the minus input thereof, an output differential amplifier resistor (134) connected between the differential amplifier and the base of said control transistor (40), said input resistors being connected to one and the other side of said memory capacitor.

4. In a battery charging device comprising in combination:

a. a transformer for transforming an AC power line supply into usuable energy, including a current limiting resistor (204) and an SCR (206) in series with said transformer and current limiting resistor for charging said battery;

b. a pulsating charging circuit operatively coupled to said transformer and disposed for charging a battery across a charging terminal (18a) supplying a pulsating charging current during each half cycle of AC alternation;

c. sensing circuit means connected to said charging terminal for sensing the voltage charged in said battery during the non charging ½ cycle;

d. a measurement an memory circuit means including storage means for storing a charge therein which is a function of said battery charge; and, e. control means responsive to said voltage sensing means and coupled to said charging circuit for changing the duration of charge upon a predetermined battery voltage for a time period measured by said measurement and memory circuit, the improvement therein comprising:

f. a tap (13) on said transormer, a first NPN transistor (214) connected to said tap at its base, a second NPN transistor (215) whose base is connected to the collector of the first NPN transistor, a measurement capacitor (22)0 charged by said second transistor collector to a value corresponding to said battery charge, said measurement capacitor (22)0 serving to interrogate the battery and record the battery voltage thereon;

g. a current transformer (222) fed by said transformer, a diode (223), resistor (225), and memory capacitor (227) in series with said current transformer secondary, said capacitor (227) memorizing the charge on said battery; and, h. a control SCR (222) operatively connected between said measurement capacitor (220) and said memory capacitor (227) by a switch (238), said switch (238) connected to said memory capacitor (227) acting to fire said control SCR (222), whereby said measurement capacitor charge increases with charging time so that when said battery charge reaches about 90 percent of the full charge said measurement capacitor discharges at a predetermined rate and causes the charging device to turn off when about 110 percent of the energy is restored to the battery under charge.

* * * * *

UNITED STATES PATENT OFFICE
Certificate

Patent No. 3,733,534      Seymour Saslow      Patented May 15, 1973

Application having been made by Seymour Saslow, the inventor named in the patent above identified, and Espey Manufacturing and Electronics Corporation, Saratoga Springs, N.Y., a corporation of the United States, the assignee, for the issuance of a certificate under the provisions of Title 35, Section 256, of the United States Code, adding the names of Robert Lackey and Charles R. Brandow as joint inventors, and a showing and proof of facts satisfying the the requirements of the said section having been submitted, it is this 18th day of December 1973, certified that the names of the said Robert Lackey and Charles R. Brandow are hereby added to the said patent as joint inventors with the said Seymour Saslow.

FRED W. SHERLING
*Associate Solicitor.*